(12) United States Patent
Choi et al.

(10) Patent No.: US 6,316,882 B1
(45) Date of Patent: Nov. 13, 2001

(54) ELECTRONIC BALLAST HAVING A STABLE REFERENCE VOLTAGE AND A MULTIFUNCTION INPUT FOR SOFT DIMMING AND ON/OFF CONTROL

(75) Inventors: Nak-Choon Choi; Maeng-Ho Seo, both of Bucheon (KR)

(73) Assignee: Fairfield Korea Semiconductor Ltd., Bucheon (KR)

(*) Notice: Subject to any disclaimer, the term of this patent is extended or adjusted under 35 U.S.C. 154(b) by 0 days.

(21) Appl. No.: 09/656,145

(22) Filed: Sep. 6, 2000

(30) Foreign Application Priority Data

Sep. 6, 1999 (KR) .................................................. 99-37689

(51) Int. Cl.[7] .................................................. H05B 37/02
(52) U.S. Cl. .......................... 315/225; 315/283; 315/291; 315/307; 315/DIG. 4
(58) Field of Search .................................... 315/225, 226, 315/246, 276, 279, 283, 291, 307, 362, DIG. 4, DIG. 5, DIG. 7; 323/355, 363, 369; 363/15, 123, 132

(56) References Cited

U.S. PATENT DOCUMENTS

| | | | | |
|---|---|---|---|---|
| 4,672,300 | * | 6/1987 | Harper | 323/285 |
| 5,500,792 | * | 3/1996 | Jeon et al. | 315/291 |
| 5,615,093 | * | 3/1997 | Nalbant | 315/307 |
| 5,825,223 | * | 10/1998 | Mader | 327/170 |
| 5,973,458 | * | 10/1999 | Seo et al. | 315/308 |

* cited by examiner

Primary Examiner—David Vu
Assistant Examiner—Thuy Vinh Tran
(74) Attorney, Agent, or Firm—Marshall, Gerstein, & Borun

(57) ABSTRACT

An electronic ballast for use in illuminating a lamp includes a voltage reference generator that uses a plurality of current amplifiers and resistors having substantially identical resistance characteristics to remain stable in response to temperature variations and despite resistance process dispersion. The reference voltage generator further includes an ON/OFF controller and a dimming function that may be controlled via a single input terminal. Additionally, the dimming function uses a capacitor to prevent abrupt changes in an input signal from causing abrupt changes in a feedback signal that controls an output frequency of the ballast.

20 Claims, 4 Drawing Sheets

ELECTRONIC BALLAST HAVING A STABLE REFERENCE VOLTAGE AND A MULTIFUNCTION INPUT FOR SOFT DIMMING AND ON/OFF CONTROL

BACKGROUND OF THE INVENTION

1. Field of the Invention

The invention relates generally to electronic ballast systems and, more particularly, the invention relates to an electronic ballast system that controls the illumination of a lamp by using a reference voltage which is temperature stable and unaffected by resistance process dispersion and which enables soft dimming and ON/OFF control of the lamp via a multi-function input terminal.

2. Description of Related Technology

Generally speaking, electronic ballast systems initiate a glow discharge within a gas-filled lamp, such as a conventional fluorescent lamp, and thereafter maintain a stable supply of power to the lamp to sustain the discharge. As is well known, conventional electronic ballast systems typically include an inverter circuit that supplies alternating current (AC) power to the lamp and a lamp driver circuit, which uses a pulse-width modulated (PWM) control signal to vary the amount of power that the inverter supplies to the lamp.

FIG. 1 is an exemplary schematic diagram of a conventional lamp system 5 that uses an electronic ballast (not shown) to control the illumination of a lamp LAMP. The lamp system 5 includes a power supply unit 10, a switching circuit 20 and a lamp unit 30, all of which are connected as shown. The power supply unit 10 supplies direct current (DC) power to the switching unit 20, which includes first and second power switches S1 and S2 that are alternately turned ON and OFF by the ballast to drive the lamp unit 30 with AC power, thereby illuminating the lamp LAMP.

As is well known in the art, when the first switch S1 is in an ON condition (i.e., is conducting current) and the second switch S2 is in an OFF condition, current flows from the power supply unit 10 through the first switch S1, an inductor L, the lamp LAMP, a first capacitor CL1 and a second capacitor CL2. On the other hand, when the first switch S1 is in an OFF condition and the second switch S2 is in an ON condition, current flows from the power supply unit 10 through a third capacitor CL3, the lamp LAMP, the first capacitor CL1, the inductor L and the second switch S2. As is also well known, a resonance circuit is formed by the inductor L, the first capacitor CL1 and the second capacitor CL2 when the first switch S1 is ON and the second switch S2 is OFF. Likewise, the inductor L, the first capacitor CL1 and the third capacitor CL3 form a resonance circuit when the second switch S2 is ON and the first switch S1 is OFF.

In operation, the illumination of the lamp LAMP is controlled by varying the switching frequency of the switching unit 20. In particular, the drive current supplied to the lamp LAMP may be increased (to increase the intensity of the amp illumination) by reducing the switching frequency of the switching unit 20 or, alternatively, may be decreased (to decrease the intensity of the lamp illumination) by increasing the switching frequency of the switching unit 20.

The ballast (not shown) compares a feedback voltage developed across a current sense resistor Rsense to a reference voltage to control the switching frequency of the switching unit 20. During normal operation, the ballast increases the switching frequency of the switching unit 20, which decreases the drive current supplied to the lamp LAMP, if the feedback voltage is larger than the reference voltage and decreases the switching frequency of the switching unit 20, which increases the drive current supplied to the lamp LAMP, if the feedback voltage is less than the reference voltage. Additionally, the reference voltage may be varied to provide a soft-start interval during initial power-up of the lamp system 5 and/or may be used to control a dimming operation of the lamp system 5.

As is generally known, the stable operation of the lamp system 5 depends on the stability of the above-noted ballast reference voltage. Unfortunately, conventional electronic ballast circuits are typically based on integrated circuits, which are typically influenced by resistance process dispersion and temperature variations that cause the reference voltage to be far from stable. Further, when conventional electronic ballasts control the dimming of a lamp, the reference voltage typically changes abruptly, which abruptly alters the current flowing through the lamp (and the illumination intensity of the lamp) and strains the entire lamp system. Still further, because conventional electronic ballast systems are based on integrated circuits, remote control over the operation of the ballast becomes difficult, particularly because separate terminals are typically required for performing ON/OFF and dimming control functions.

SUMMARY OF THE INVENTION

In accordance with one aspect of the invention, a current amplifier for use in an electronic ballast includes a current source and a differential amplifier coupled to the current source. The differential amplifier may include first and second resistors and first and second transistors. An emitter terminal of the first transistor may be coupled to the first resistor and an emitter terminal of the second transistor may be coupled to the second resistor. The current amplifier may further include a selection circuit having third and fourth transistors and the emitter terminals of the third and fourth transistors may be coupled to each other and to a base terminal of the second transistor. Additionally, the current amplifier may include a first current mirror, a second current mirror coupled to the first current mirror and a collector terminal of the first transistor and a third current mirror coupled to the first current mirror and a collector terminal of the second transistor.

In accordance with another aspect of the invention, a reference voltage generator for use in an electronic ballast includes a comparison voltage generator having a soft start current source and a soft start capacitor coupled to the soft start current source. The reference voltage generator may further include a first amplifier having a first current amplifier. The first current amplifier may have first and second non-inverting input terminals and a first inverting input terminal. Additionally, one of the first and second non-inverting input terminals may be coupled to the soft start capacitor and the other one of the first and second non-inverting input terminals may coupled to a first amplifier reference voltage. The reference voltage generator may further include a first current source having a first current mirror, first and second resistors and a first transistor. A first output terminal of the first current mirror may be coupled to a collector terminal of the first transistor and a second output terminal of the first current mirror may be coupled to the second resistor. Still further, a base terminal of the first transistor may be coupled to an output terminal of the first current amplifier and the first resistor may be coupled between a ground potential and the inverting input terminal of the first current amplifier. Still further, the reference voltage generator may include a capacitor charger that compares a voltage across the soft start capacitor to a first comparison reference voltage and charges a dimming capacitor based on the comparison. The reference voltage generator may additionally include a second amplifier having a second current amplifier. The second current amplifier may have third and fourth non-inverting input terminals and a second inverting input terminal and one of the third and fourth non-inverting input terminals may be coupled to a dimming voltage and the other one of the third and fourth non-inverting input terminals may be coupled to a second amplifier reference voltage. An output terminal of the second current amplifier may be coupled to the dimming capacitor and the second current amplifier may select the smaller of the dimming voltage and the second amplifier reference voltage to control a charging characteristic of the dimming capacitor. Still further, the voltage reference generator may include a second current source that supplies a current proportional to the voltage selected by the second current amplifier and the charging characteristic of the dimming capacitor and an ON/OFF controller that controls the operation of a lamp system based on a comparison of the dimming voltage to a second comparison reference voltage.

The invention itself, together with further objectives and attendant advantages, will best be understood by reference to the following detailed description, taken in conjunction with the accompanying drawings and the appended claims.

DETAILED DESCRIPTION OF THE PREFERRED EMBODIMENTS

Figure 1:
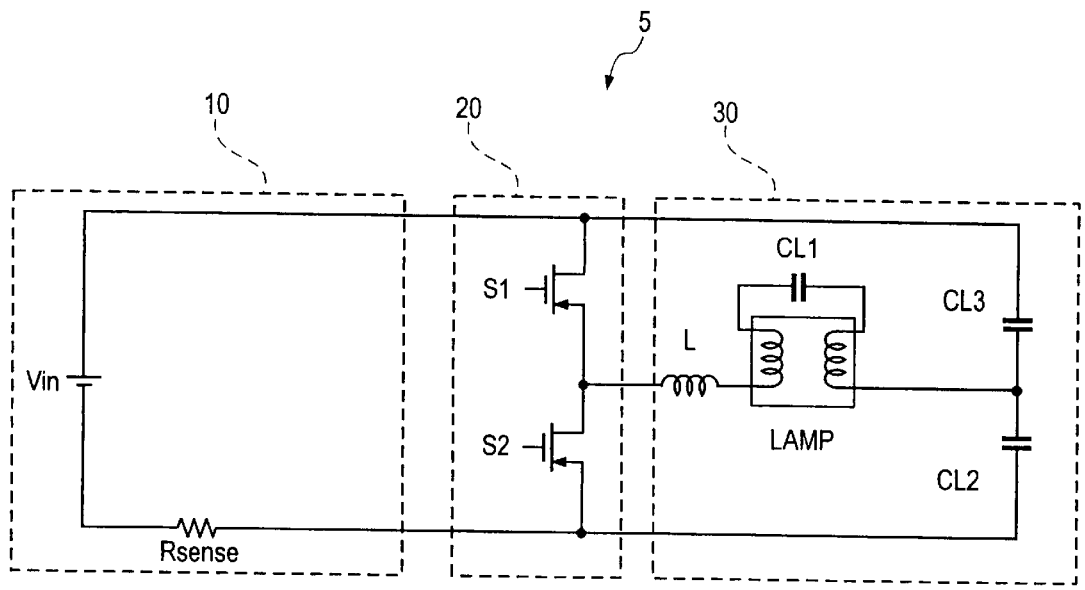
FIG. 1 is an exemplary schematic diagram of a conventional lamp system that may be controlled by an electronic ballast.
Figure 2:
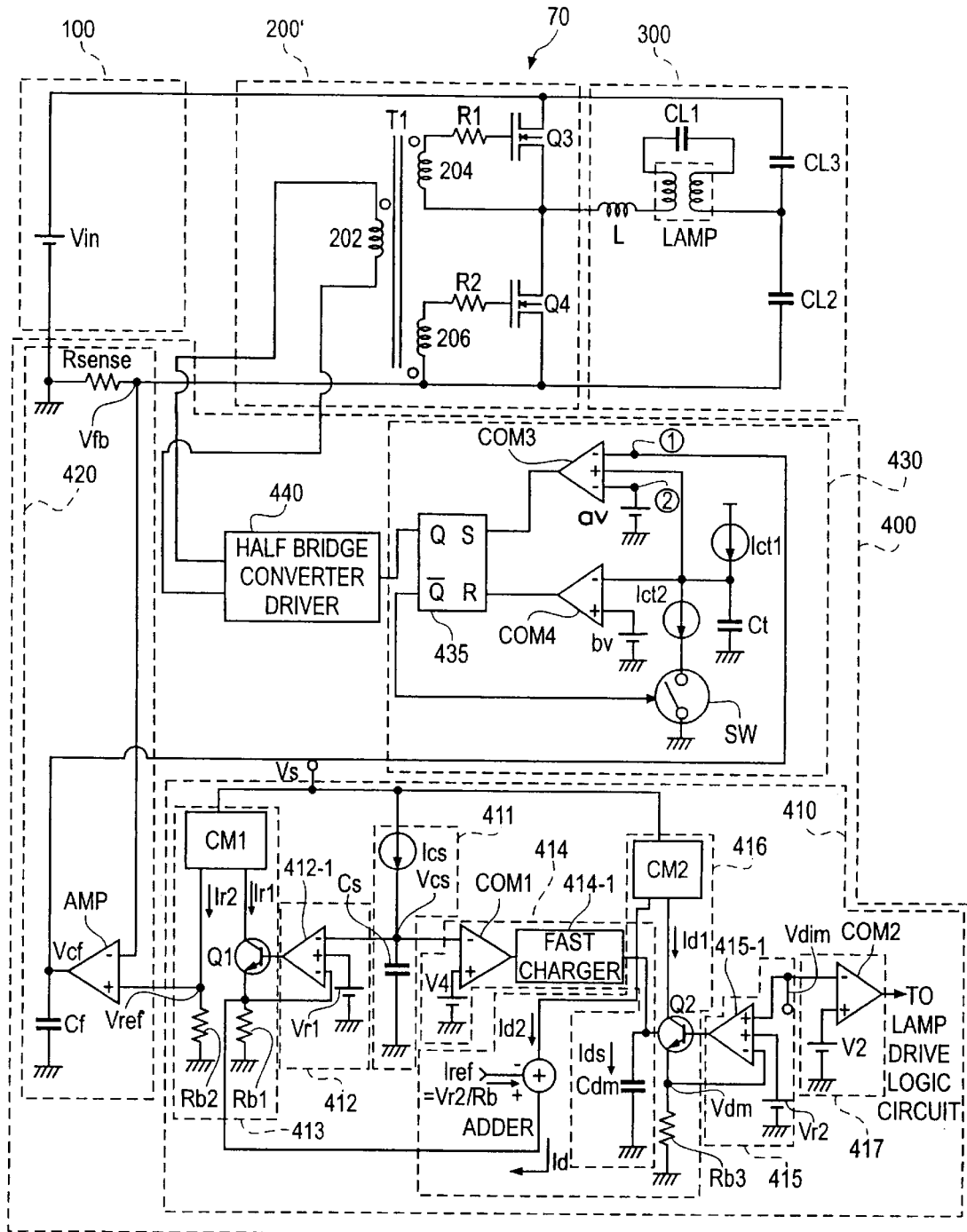
FIG. 2 is an exemplary schematic diagram of a lamp system having an electronic ballast according to an embodiment of the invention.

FIG. 2 illustrates an exemplary schematic diagram of a lamp system 70 having an electronic ballast according to an embodiment of the invention. The lamp system 70 includes a power supply unit 100, a half bridge converter 200, a lamp unit 300 and a ballast 400, all connected as shown.

The power supply unit 100 supplies DC power to the half bridge converter 200 which, in turn, supplies AC power to the lamp unit 300. The half bridge converter 200 includes a transformer T1, transistors Q3 and Q4, which may be metal oxide semiconductor field effect transistors (MOSFETs) or any other suitable transistors, and resistors R1 and R2. The transformer T1 has a primary winding 202, an upper secondary winding 204 that drives a gate terminal of the transistor Q3 via the resistor R1 and a lower secondary winding 206 that drives a gate terminal of the transistor Q4 via the resistor R2. As shown, the magnetic senses of the secondary windings 204 and 206 are oppositely directed so that the switches Q3 and Q4 do not conduct at the same time. Thus, in operation, the switch Q3 conducts during one half cycle of the AC signal, which is applied to the primary 202 by the ballast 400, and the switch Q4 conducts during the other half cycle.

The lamp unit 300 includes a lamp LAMP, an inductor L and capacitors CL1, CL2 and CL3, all connected as shown in FIG. 2. As is generally known, the inductor L and the capacitors CL1, CL2 and CL3 form resonance circuits based on the switching operation of the half bridge converter 200. In particular, when the switch Q3 is ON (i.e., conducting) and the switch Q4 is OFF, current flows through the inductor L, the lamp LAMP, the capacitor CL1 and the capacitor CL2, and a resonance state is established in the inductor L, the capacitor CL1 and the capacitor CL3. On the other hand, if the switch Q3 is OFF and the switch Q4 is ON, current flows through the capacitor CL3, the lamp LAMP, the capacitor CL1 and the inductor L, which results in a resonance condition in the inductor L, the capacitor CL1 and the capacitor CL3.

The illumination intensity of the lamp LAMP is proportional to the magnitude of the current flowing through the lamp LAMP which, in turn, is inversely proportional to the switching frequency of the half bridge converter 200. Thus, if the switching frequency of the half bridge converter 200 increases, the magnitude of the lamp drive current decreases, and if the switching frequency of the half bridge converter 200 decreases, the magnitude of the lamp drive current increases.

The ballast 400 monitors a feedback voltage Vfb developed across a current sense resistor Rsense, which monitors the drive current flowing through the lamp LAMP, and compares the feedback voltage Vfb to a reference voltage Vref, which is discussed in greater detail below. The ballast 400 may vary the frequency and/or duty cycle of the AC signal applied to the primary 202 based on the result of the comparison. For example, if the feedback voltage Vfb is greater than the reference voltage (i.e., the drive current in the lamp LAMP is greater than a desired valve), the ballast 400 may increase the frequency of the AC signal applied to the primary 202, thereby reducing the drive current flowing through the lamp LAMP. On the other hand, if the feedback voltage Vfb is less than the reference voltage (i.e., the drive current in the lamp LAMP is less than a desired valve), the ballast 400 may decrease the frequency of the AC signal applied to the primary 202, thereby increasing the drive current flowing through the lamp LAMP.

In operation, the reference voltage Vref within the ballast 400 may be varied to carry out multiple functions. For instance, the reference voltage Vref may be varied to accomplish a soft start or a dimming operation. In any event, as described in greater detail below, the reference voltage Vref is not affected by resistance process dispersion or temperature variations, as are the reference voltages within conventional electronic ballast circuits.

The ballast 400 includes a reference voltage generator 410, a feedback circuit 420, an oscillator 430 and a half bridge converter driver 440. As discussed above, the reference voltage generator 410 produces the reference voltage Vref, which is compared to the feedback voltage Vfb to control the switching frequency of the half bridge converter 200. Additionally, the reference voltage generator 410 enables the operations of the lamp system 70 to be turned ON or OFF.

The reference voltage generator 410 includes a comparison voltage generator 411, first amplifier 412, a first current source 413, a capacitor charger 414, a second amplifier 415, a second current source 416 and an ON/OFF controller 417. The comparison voltage generator 411 includes a soft start current source Ics and a soft start capacitor Cs. As shown, the voltage across the soft start capacitor Cs is applied to the first amplifier 412 and the capacitor charger 414.

The first amplifier 412 includes a first current amplifier 412-1, which includes two non-inverting input terminals and one inverting input terminal. One of the two non-inverting input terminals receives the voltage developed across the soft start capacitor Cs and the other one of the non-inverting terminals receives a first amplifier reference voltage Vr1. The first current amplifier 412-1 selects the smaller one of the voltages applied to the non-inverting terminals and uses this selected voltage to control the output of the first current amplifier 412-1.

Figure 3:
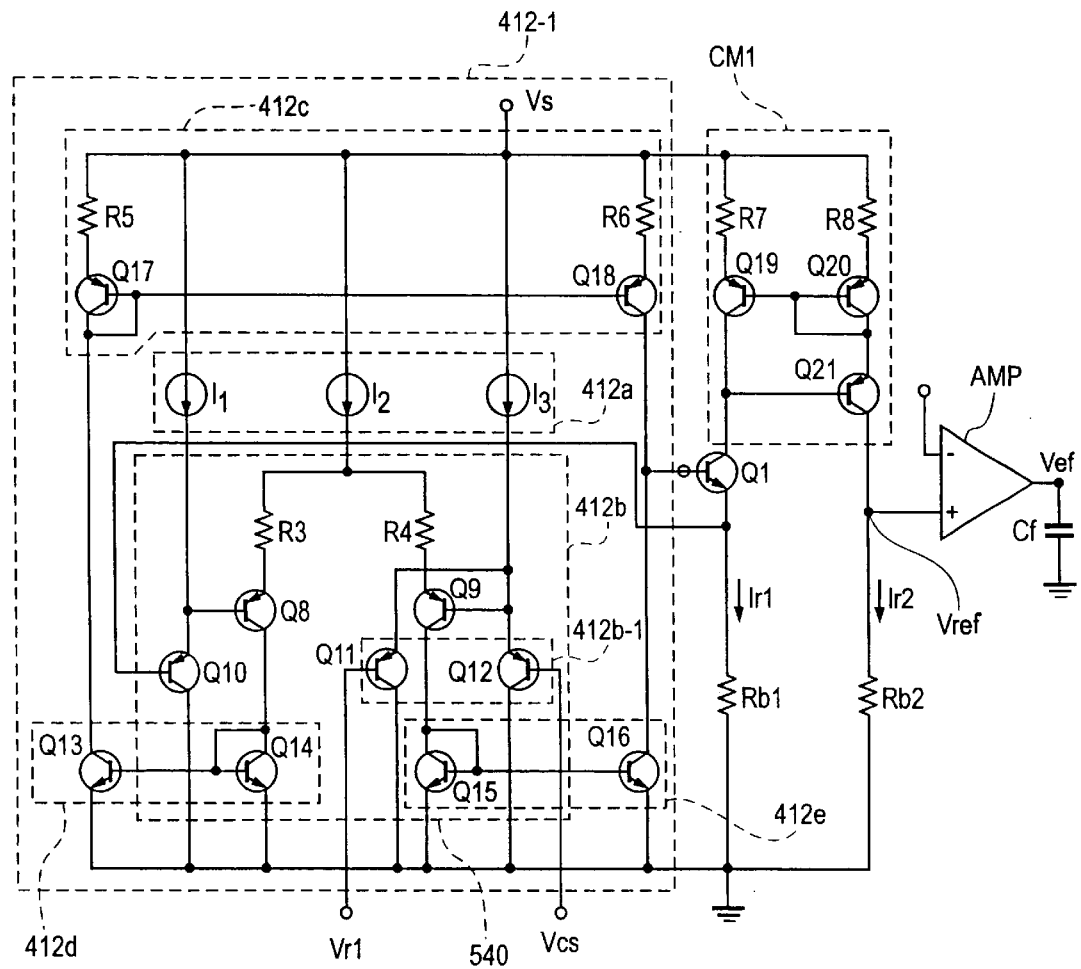
FIG. 3 is a more detailed exemplary schematic diagram of the first current amplifier shown in FIG. 2.

FIG. 3 is a more detailed exemplary schematic diagram of the first current amplifier 412-1 shown in FIG. 2. The first current amplifier 412-1 includes an internal current source 412a having a first current source I1, a second current source I2 and a third current source I3. The first current amplifier 412-1 further includes a differential amplifier 412b, which includes resistors R3 and R4 and transistors Q8–Q10, a first internal current mirror 412c, which includes transistors Q17 and Q18 and resistors R5 and R6, a second internal current mirror 412d, which includes transistors Q13 and Q14, and a third internal current mirror 412e, which includes transistors Q15 and Q16.

Generally speaking, the internal current source 412a provides drive current to the differential amplifier 412b. The differential amplifier 412b includes a selection circuit 412b-1 having transistors Q11 and Q12, which are connected to one another at a common emitter terminal. The common emitter terminal of the selection circuit 412b-1 is connected to a base terminal of the transistor Q9 so that the base terminals of the transistors Q11 and Q12 function as the non-inverting terminals of the first current amplifier 412-1. Further, the base terminal of the transistor Q10, which functions as the inverting input of the first current amplifier 412-1, is connected to a resistor Rb1. Because the transistors Q11 and Q12 are PNP-type transistors, the selection circuit 412b-1 applies the smaller one of the voltages Vr1 and Vcs to the base terminal of the transistor Q9, which is the non-inverting input of the differential amplifier 412b.

The first internal current mirror 412c produces substantially identical currents at the collector terminals of the transistors Q17 and Q18 and the second internal current mirror 412d produces a current, which is equal in magnitude to the current supplied to the transistor Q17 of the first internal current mirror 412c, through the transistors Q13 and Q14. Likewise, the third internal current mirror 412e produces a current, which is equal in magnitude to the current supplied to the transistor Q18 of the first internal current mirror 412c, through the transistors Q15 and Q16.

In operation, if the voltages Vr1 and Vcs, which are smaller in magnitude than a voltage Vs (i.e., a supply voltage which provides power to the ballast 400), are applied to the non-inverting terminals of the first current amplifier 412-1, the transistors Q11 and Q12 within the selection circuit 412b-1 are biased so that the smaller one of the voltages Vr2 and Vcs is applied to the base terminal (i.e., the non-inverting input) of the differential amplifier 412-b.

The first internal current mirror 412c provides currents of equal magnitude through the transistors Q17 and Q18. These equal currents flow via the transistor Q13 of the second internal current mirror 412d and the transistor Q16 of the third internal current mirror 412e. Additionally, these equal currents flow, by operation of the current mirrors 412d and 412e, through the transistors Q14 and Q15. Thus, if the resistors R3 and R4 are substantially identical and if the transistors Q8 and Q9 of the differential amplifier 412b are substantially identical, currents equal in magnitude are supplied to the transistors Q8 and Q9. As a result, the differential amplifier 412-b applies the smaller of the voltages Vr1 and Vcs to the resistor Rb1.

Referring again to FIG. 2, the first current source 413 includes a first current mirror CM1, a transistor Q1, the resistor Rb1 and a resistor Rb2. The first current mirror CM1 outputs a first current Inr via the collector terminal of the transistor Q1 and a second current Ir2. A base terminal of the transistor Q1 is connected to an output terminal of the first current amplifier 412-1 and an emitter terminal of the transistor Q1 is connected to the resistor Rb1 and to the inverting input terminal of the first current amplifier 412-1. One terminal of the resistor Rb2 is connected to an output terminal of the first current mirror CM1 and the other terminal is connected to a ground potential.

As noted above, the voltage applied to the resistor Rb1 is equal to the smaller one of the voltages Vr1 and Vcs, which are applied to the inverting input terminals of the first current amplifier 412-1. Thus, the magnitude of the current flowing through Rb1 is equal to the sum of all currents input externally and, as a result, the first current Ir1 is determined by the magnitude of the currents input externally and the magnitude of the selected one of the voltages Vr1 and Vcs that is applied to the inverting input terminal of the differential amplifier 412b. The first current mirror CM1 causes a current Ir2, which is substantially equal or proportional to the current Ir1, to flow through the resistor Rb2, thereby generating the reference voltage Vref.

The capacitor charger 414 includes a first comparator COM1, a fast charger 414-1, and a dimming capacitor Cdm. The soft start voltage Vcs is applied to the inverting input terminal of the first comparator COM1 and a first comparison reference voltage V4 is applied to the non-inverting input terminal of the first comparator COM1. During initial power-up of the lamp system 70, the fast charger 414-1 provides a charging current to the dimming capacitor Cdm while the comparison reference voltage V4 is greater than the soft start voltage Vcs.

The second amplifier 415 provides charging and discharging currents to the dimming capacitor Cdm, which prevents abrupt changes in the output stage of the second amplifier 415 from rapidly changing the voltage applied to the base terminal of the transistor Q2. The second amplifier 415 includes a second current amplifier 415-1 having two non-inverting input terminals and one inverting input terminal. A dimming voltage is applied to one of the non-inverting input terminals and a second amplifier reference voltage Vr2 is applied to the other one of the non-inverting input terminals. In a manner similar to that used within the first current amplifier 415-1, the second current amplifier 415-1 selects and outputs the smaller one of the reference voltage Vr2 and the dimming voltage Vdim.

The second current source 416 includes a second current mirror CM2, a second transistor Q2, a resistor Rb3 and an adder. The second current mirror CM2 outputs currents Id1 and Id2, which are equal in magnitude, through two output terminals. An emitter of the second transistor Q2 is connected to an output terminal of the second current mirror CM2 and a base terminal of the second transistor Q2 is connected to an output terminal of the second current amplifier 415-1. In operation, the second current amplifier 415-1 selects the lesser of the two voltages Vr2 and Vdim and causes the current Id1 to be increased or decreased so that the selected voltage is developed across the resistor Rb3.

The adder of the second current source 416 has a first terminal connected to the second current mirror CM2, a second terminal connected to a reference current Iref and a third terminal connected to the resistor Rb1. A dimming current output Id of the adder is equal to Iref-Id2, where Iref=Vr2/Rb. In this case, Rb=Rb3 so that when Vdim is less than Vr2, the dimming current output Id of the adder is substantially near zero.

To accomplish a dimming operation, the voltage Vdim may be reduced to be less than the voltage Vr2, which causes the currents Id1 and Id2 to decrease and the dimming output current Id of the adder to increase. The increased dimming output current Id of the adder causes the first current amplifier 412 to reduce the current drawn from the first current mirror CM1 which, in turn, reduces the current Ir2 and the reference voltage Vref. As a result of the reduced reference voltage Vref, the current supplied to the lamp LAMP is reduced, which reduces the illumination intensity of the lamp LAMP. It is important to recognize that abrupt changes in the output of the second current amplifier 415-1, as a result of a dimming operation, are damped by the dimming capacitor Cdm so that a soft dimming operation is realized.

The ON/OFF controller 417 includes a second comparator COM2, which receives the dimming voltage Vdim at an inverting input terminal and a second comparison reference voltage V2 at a non-inverting input terminal. When the dimming voltage Vdim is less than the second comparison reference voltage V2, the lamp LAMP is turned OFF.

The feedback circuit 420 includes a current sense resistor Rsense, a third current amplifier Amp and a feedback capacitor Cf. The current sense resistor Rsense detects the magnitude of the drive current supplied to the lamp unit 300 as the feedback voltage Vfb. An inverting input terminal of the third current amplifier Amp is connected to the current sense resistor Rsense and the non-inverting input of the third current amplifier Amp is connected to the resistor Rb2. As a result, the third current amplifier Amp compares the feedback voltage Vfb to the reference voltage Vref to produce an error signal that is applied to the feedback capacitor Cf and the oscillator 430.

The oscillator 430 includes a third comparator COM3, a fourth comparator COM4, a first constant voltage aV, a second constant voltage bV, which is larger than the first constant voltage aV, a timing capacitor Ct, a charging current source Ict1, a discharging current source Ict2, a latch 435 and a switch SW. A first inverting input terminal of the third comparator COM3 is connected to the feedback capacitor Cf and a second inverting input terminal of the third comparator COM3 is connected to the first constant voltage aV. A non-inverting input terminal of the third comparator COM3 is connected to a joint terminal of the timing capacitor Ct and the charging current source Ict1. The third comparator COM3 selects the smaller one of the voltages applied to the inverting input terminals for comparison with the voltage applied to the non-inverting input terminal. Similarly, the fourth comparator COM4 has an inverting terminal that is connected to the joint terminal of the charging current source Ict1 and the timing capacitor Ct and a non-inverting input terminal that is connected to the second constant voltage bV.

A reset terminal R of the latch 435 is connected to an output terminal of the fourth comparator COM4, a set terminal S of the latch 435 is connected to an output terminal of the third comparator COM3, an output terminal Q of the latch 435 is connected to the half bridge converter driver 440, and an output terminal $\overline{Q}$ of the latch 435 is connected to the switch SW.

In operation, the oscillator 430 produces a variable frequency AC signal to drive the primary 202 based on the magnitude of the feedback voltage Vcf. If the feedback voltage Vcf is less than the first constant voltage aV, the third comparator COM3 selects and compares a feedback signal Vcf to the voltage across the timing capacitor Ct. Alternatively, if the feedback signal Vcf is greater than the first constant voltage aV, the third comparator COM3 selects and compares the first constant voltage aV to the voltage across the timing capacitor Ct.

Initially, the switch SW is open, the voltage across the timing capacitor Ct is substantially near zero volts, the output of the third comparator COM3 is in a logical low condition, the output of the fourth comparator COM4 is in a logical high condition, the output terminal Q is in a logical low condition and the output terminal $\overline{Q}$ is in a logical high condition. When the charging current source Ict1 charges the timing capacitor Ct and the voltage across the timing capacitor Ct increases to exceed the selected voltage, the output of the third comparator COM3 transitions to a logical high condition, the output terminal Q of the latch 435 transitions to a logical high condition, the output terminal $\overline{Q}$ transitions to a logical low condition and the switch SW closes.

With the switch SW closed, the discharging current source Ict2, which draws a current having a magnitude greater than the magnitude of the current provided by the charging current source Ict1, begins to reduce the voltage across the timing capacitor Ct. When the voltage across the timing capacitor Ct falls below the second constant voltage bV, the output of the fourth comparator COM4 transitions to a logical high condition, the output terminal Q transitions to a logical low condition, the output terminal $\overline{Q}$ transitions to a logical high condition and the switch SW opens.

As can be seen from the above description, the voltage across the timing capacitor Ct limit cycles between about the second constant voltage bV and either one of the first constant voltage aV or the feedback signal Vcf as selected by the third comparator COM3. This limit cycling causes the output terminal Q of the latch 435 to cycle between logical high and low conditions at a frequency which is the same as the limit cycle frequency of the voltage across the timing capacitor Ct. The cycling output of the output terminal Q causes the half bridge converter driver 440 to generate an AC signal across the primary 202 of the switching unit 200. The half bridge converter 440 may include a frequency divider (not shown) so that the AC signal developed across the primary 202 is proportional to the frequency of the signal generated on the output terminal Q.

If the feedback signal Vcf is selected by the third comparator COM3 and the feedback voltage Vfb is greater than the reference voltage Vref, the output of the third amplifier Amp will decrease the magnitude of the feedback signal Vcf. A decrease in the magnitude of the feedback signal Vcf effectively lowers the upper voltage for the limit cycling of the voltage across the timing capacitor Ct, which increases the frequency of the oscillator 430 and the AC signal applied to the primary 202, thereby decreasing the current delivered to the lamp unit 300.

On the other hand, if the feedback signal Vcf is selected by the third comparator COM3 and the feedback voltage Vfb is less than the reference voltage Vref, the output of the third amplifier Amp will increase the magnitude of the feedback signal Vcf. An increase in the magnitude of the feedback signal Vcf effectively increases the upper voltage for the limit cycling of the voltage across the timing capacitor Ct, which decreases the frequency of the output of the oscillator 430 and the AC signal applied to the primary 202, thereby increasing the current delivered to the lamp unit 300.

Figure 4A:
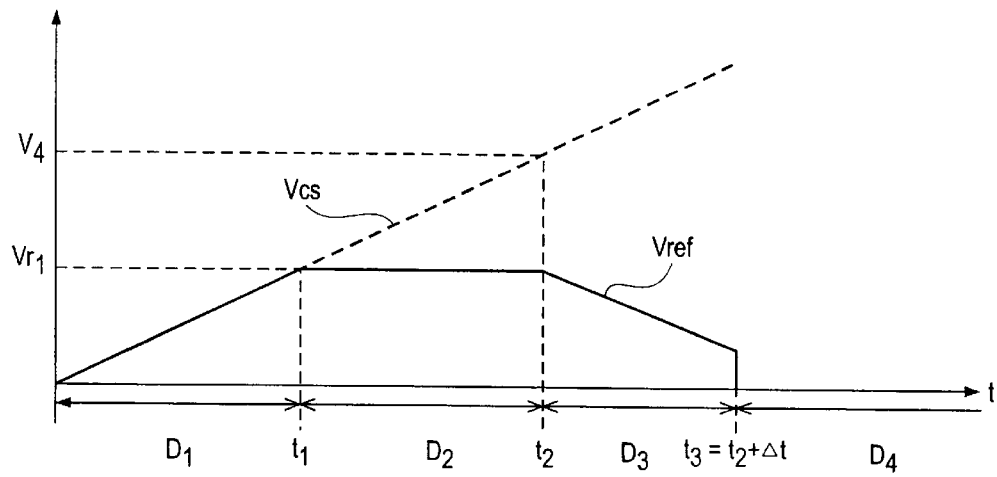
FIG. 4a is an exemplary graphical representation of a reference voltage signal that may be used within the electronic ballast shown in FIG. 2.
Figure 4B:
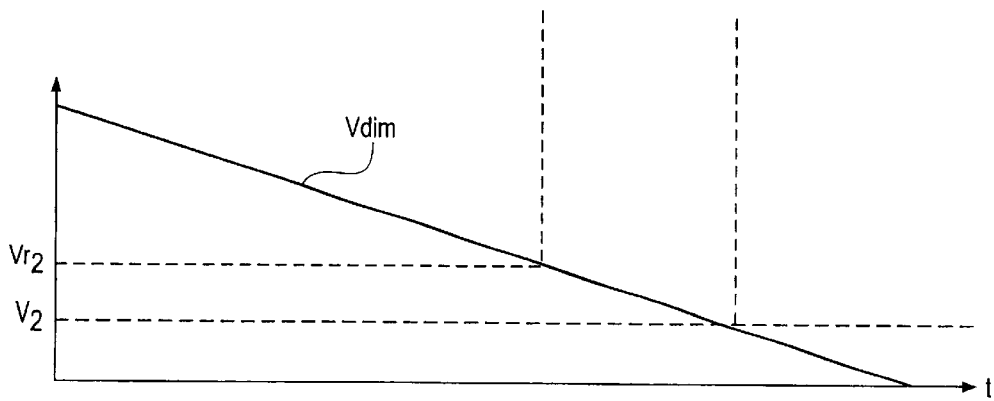
FIG. 4b is an exemplary graphical representation of a dimming voltage that may be used within the electronic ballast shown in FIG. 2.

FIG. 4a is an exemplary graphical representation of the reference voltage signal Vref, which may be used within the electronic ballast 400 shown in FIG. 2, and FIG. 4b is an exemplary graphical representation of a dimming voltage that may be used within the electronic ballast shown in FIG. 2. As shown in FIG. 4a, if a user controls a power switch (not shown) of the lamp system 70 to an ON condition, the soft start current source Ics charges the soft start capacitor Cs at a predetermined rate, thereby initiating a soft starting operation. Because the voltage applied to the soft start capacitor Cs is initially less than the first amplifier reference voltage Vr1, the first current amplifier 412-1 selects the soft start capacitor voltage Vcs, which is the smaller of the voltages applied to the non-inverting input terminals of the first current amplifier 412-1. As a result, the voltage applied to the resistor Rb1 is identical to the soft start soft start capacitor voltage Vcs during the interval D1.

Further, as shown in FIG. 4b, because the dimming voltage Vdim is greater than the second amplifier reference voltage Vr2 during the interval D1, the second current amplifier 415-1 selects the second amplifier reference voltage Vr2. As a result, the voltage applied to the inverting terminal of the second current amplifier 415-1 is substantially equal to the second amplifier reference voltage Vr2 and the current Id1 input to the resistor Rb3 is equal to Vr2/Rb3. Still further, the second current mirror CM2 causes Id2=Id1 and, thus, the output current Id of the adder in this case is substantially equal to zero.

With the adder output current Id substantially equal to zero, the current Ir1=Vcs/Rb1, the current Ir2 is substantially equal to the current Ir1 and the reference voltage Vref=(Vcs/Rb1)*Rb2, which, in the case where Rb1=Rb2, is substantially equal to the soft start capacitor voltage Vcs. Thus, as shown in FIG. 4a, the reference voltage Vref coincides with the soft start voltage Vcs during the interval D1. Further, because the soft start capacitor voltage Vcs is less than the first comparison reference voltage V4 during the interval D1, the output of the first comparator COM1 is in a logical high condition, which causes the fast charger 414-1 to charge the dimming capacitor Cdm.

In interval D2, the soft start voltage Vcs exceeds the first amplifier reference voltage Vr1, which causes the first amplifier 412-1 to select the first amplifier reference voltage Vr1 and the voltage applied to the resistor Rb1 to equal the first amplifier reference voltage Vr1. Because the dimming voltage Vdim is larger than the second amplifier reference voltage Vr2 during the interval D2, the output current Id of the adder remains substantially near zero. As a result, the reference voltage Vref=(Vr1/Rb1)*Rb2 which, in this case, reduces to Vref=Vr1 because Rb1=Rb2. Further, because the soft start capacitor voltage Vcs remains below the first comparison voltage V4 during the interval D2, the fast charger 414-1 continues to supply charge to the dimming capacitor Cdm.

If the soft start capacitor voltage Vcs becomes greater than the first comparison reference voltage V4 at time T2, the output of the first comparator COM1 transitions to a logical low condition and the fast charger 414-1 stops providing charge to the dimming capacitor Cdm. Following a delay time, the dimming capacitor Cdm begins to discharge. The delay time Δt=Cdm*(Vdm+Vbe)/Ids, where Vbe is the voltage between the base and emitter terminals of the second transistor Q2 and Ids is the magnitude of the current output by the fast charger 414-1.

As shown in FIG. 4b, if the dimming voltage Vdim is less than the second amplifier reference voltage Vr2, the second current amplifier 415-1 selects the dimming voltage Vdim and the voltage applied to the resistor Rb3 becomes the dimming voltage Vdim. In this case, the reduction of the voltage Vdm does not follow the dimming voltage Vdim, but instead stops for the time delay Δt before decreasing.

With the dimming voltage Vdim selected by the second current amplifier 415-1, the output current id of the adder equals Vr2/Rb-Vdim/Rb3, which reduces to Id=1/Rb3*(Vr2-Vdim) when Rb=Rb3. With a nonzero adder output current, the current supplied to the resistor Rb1 equals Ir1+Id and the reference voltage Vref=(Vr1/Rb1-Id)*Rb2.

As shown in FIG. 4b, if the dimming voltage Vdim is smaller than the second comparison reference voltage V2 at time T3, the ON/OFF controller 417 sends an output signal to the lamp output drive logic so that the output of the lamp LAMP is turned OFF.

Preferably, the resistors Rb1 and Rb2 have substantially identical temperature coefficients and resistance process dispersions so that the reference voltage Vref remains stable over temperature and so that the reference voltage Vref is not affected by resistance process dispersion. Further, if the first amplifier reference voltage Vr1 is designed to be stable over temperature by using a band gap circuit, the reference voltage Vref has the same temperature characteristics as the soft start capacitor Cs.

A range of changes and modifications can be made to the preferred embodiment described above. The foregoing detailed description should be regarded as illustrative rather than limiting and the following claims, including all equivalents, are intended to define the scope of the invention.

What is claimed is:

1. A current amplifier for use in an electronic ballast, the current amplifier comprising:
   a current source;
   a differential amplifier coupled to the current source, the differential amplifier including first and second resistors and first and second transistors, wherein an emitter terminal of the first transistor is coupled to the first resistor and an emitter terminal of the second transistor is coupled to the second resistor;
   a selection circuit including third and fourth transistors, wherein an emitter terminal of the third transistor is coupled to an emitter terminal of the fourth transistor and the emitter terminals of the third and fourth transistors are coupled to a base terminal of the second transistor;
   a first current mirror;
   a second current mirror coupled to the first current mirror and to a collector terminal of the first transistor; and
   a third current mirror coupled to the first current mirror and to a collector terminal of the second transistor.

2. The current amplifier of claim 1, wherein base terminals of the third and fourth transistors are non-inverting input terminals of the selection circuit and wherein collector terminals of the third and fourth transistors are coupled to a ground potential.

3. The current amplifier of claim 1, wherein the first and second resistors have substantially identical resistance characteristics.

4. The current amplifier of claim 1, wherein the first and second transistors have substantially identical electrical characteristics.

5. The current amplifier of claim 1, wherein the third and fourth transistors have substantially identical electrical characteristics.

6. The current amplifier of claim 1, wherein the second current mirror includes fifth and sixth transistors and the third current mirror includes seventh and eighth transistors and wherein the fifth through eighth transistors have substantially identical electrical characteristics.

7. The current amplifier of claim 1, wherein first current mirror includes ninth and tenth transistors having substantially identical electrical characteristics.

8. The current amplifier of claim 1, wherein the first current mirror includes third and fourth resistors having substantially identical resistance characteristics.

9. A reference voltage generator for use in an electronic ballast, the reference voltage generator comprising:

a comparison voltage generator having a soft start current source and a soft start capacitor coupled to the soft start current source;

a first amplifier having a first current amplifier, wherein the first current amplifier has first and second non-inverting input terminals and a first inverting input terminal and wherein one of the first and second non-inverting input terminals is coupled to the soft start capacitor and the other one of the first and second non-inverting input terminals is coupled to a first amplifier reference voltage;

a first current source having a first current mirror, first and second resistors, and a first transistor, wherein a first output terminal of the first current mirror is coupled to a collector terminal of the first transistor and a second output terminal of the first current mirror is coupled to the second resistor and wherein a base terminal of the first transistor is coupled to an output terminal of the first current amplifier and the first resistor is coupled between a ground potential and the inverting input terminal of the first current amplifier;

a capacitor charger that compares a voltage across the soft start capacitor to a first comparison reference voltage and charges a dimming capacitor based on the comparison;

a second amplifier having a second current amplifier, wherein the second current amplifier has third and fourth non-inverting input terminals and a second inverting input terminal and wherein one of the third and fourth non-inverting input terminals is coupled to a dimming voltage and the other one of the third and fourth non-inverting input terminals is coupled to a second amplifier reference voltage and wherein an output terminal of the second current amplifier is coupled to the dimming capacitor and the second current amplifier selects the smaller of the dimming voltage and the second amplifier reference voltage to control a charging characteristic of the dimming capacitor;

a second current source that supplies a current proportional to the voltage selected by the second current amplifier and the charging characteristic of the dimming capacitor; and an ON/OFF controller that controls the operation of a lamp system based on a comparison of the dimming voltage to a second comparison reference voltage.

10. The reference voltage generator of claim 9, wherein the first and second current amplifiers each comprise:

a current source;

a differential amplifier coupled to the current source, the differential amplifier including third and fourth resistors and second and third transistors, wherein an emitter terminal of the second transistor is coupled to the third resistor and an emitter terminal of the third transistor is coupled to the fourth resistor;

a selection circuit including fourth and fifth transistors, wherein an emitter terminal of the fourth transistor is coupled to an emitter terminal of the fifth transistor and the emitter terminals of the fourth and fifth transistors are coupled to a base terminal of the third transistor;

a first current mirror;

a second current mirror coupled to the first current mirror and to a collector terminal of the second transistor; and a third current mirror coupled to the first current mirror and to a collector terminal of the third transistor.

11. The reference voltage generator of claim 10, wherein base terminals of the fourth and fifth transistors are non-inverting input terminals of the selection circuit and wherein collector terminals of the fourth and fifth transistors are coupled to a ground potential.

12. The reference voltage generator of claim 9, wherein the first and second resistors have substantially identical thermal characteristics and resistance process dispersions.

13. The reference voltage generator of claim 9, wherein the capacitor charger comprises:

a first comparator having an inverting input terminal coupled to the soft start capacitor voltage and a non-inverting input terminal coupled to the first comparison reference voltage;

a fast charger coupled to an output terminal of the first comparator that provides a charging output based on a comparison of the soft start capacitor voltage and the first comparison reference voltage; and a dimming capacitor coupled to an output terminal of the fast charger, a base terminal of a second transistor and the output terminal of the second transistor.

14. The reference voltage generator of claim 9, wherein the first amplifier reference voltage is less than the first comparison reference voltage.

15. The reference voltage generator of claim 9, wherein the second current source comprises:

a second current mirror having first and second output terminals that output currents of equal magnitude;

a second transistor having an emitter terminal coupled to an output terminal of the second current mirror and a base terminal coupled to the output terminal of the second current amplifier; and an adder having first, second and third terminals, wherein the first terminal is coupled to the second current mirror, the second terminal is coupled to a reference current and the third terminal is coupled to the first resistor, and wherein the adder supplies a current to the first resistor based on a difference between the current output by the second current mirror and the reference current.

16. The reference voltage generator of claim 9, wherein a magnitude of the first comparison reference voltage determines a soft dimming starting point.

17. A ballast for use in a lamp system, the ballast comprising:

a reference voltage generator having a terminal that controls ON/OFF operation and dimming of the lamp system, wherein the reference voltage generator further includes a dimming capacitor that prevents abrupt variations in a reference voltage and wherein the reference voltage generator includes a plurality of resistors having resistance characteristics such that the reference voltage is substantially stable in response to temperature variations and resistance process dispersion;

an oscillator that generates an alternating current signal based on a voltage output by a feedback circuit;

a half bridge converter; and a half bridge converter driver that uses the alternating current signal to drive the half bridge converter.

18. The ballast of claim 17, wherein the reference voltage generator comprises:

a comparison voltage generator having a soft start current source and a soft start capacitor coupled to the soft start current source;

a first amplifier having a first current amplifier, wherein the first current amplifier has first and second non-inverting input terminals and a first inverting input terminal and wherein one of the first and second non-inverting input terminals is coupled to the soft start capacitor and the other one of the first and second non-inverting input terminals is coupled to a first amplifier reference voltage;

a first current source having a first current mirror, first and second resistors and a first transistor, wherein a first output terminal of the first current mirror is coupled to a collector terminal of the first transistor and a second output terminal of the first current mirror is coupled to the second resistor and wherein a base terminal of the first transistor is coupled to an output terminal of the first current amplifier and the first resistor is coupled between a ground potential and the inverting input terminal of the first current amplifier;

a capacitor charger that compares a voltage across the soft start capacitor to a first comparison reference voltage and charges a dimming capacitor based on the comparison;

a second amplifier having a second current amplifier, wherein the second current amplifier has third and fourth non-inverting input terminals and a second inverting input terminal and wherein one of the third and fourth non-inverting input terminals is coupled to a dimming voltage and the other one of the third and fourth non-inverting input terminals is coupled to a second amplifier reference voltage and wherein an output terminal of the second current amplifier is coupled to the dimming capacitor and the second current amplifier selects the smaller of the dimming voltage and the second amplifier reference voltage to control a charging characteristic of the dimming capacitor;

a second current source that supplies a current proportional to the voltage selected by the second current amplifier and the charging characteristic of the dimming capacitor; and an ON/OFF controller that controls the operation of a lamp system based on a comparison of the dimming voltage to a second comparison reference voltage.

19. A lamp system, comprising:

a power supply unit that supplies a lamp drive power;

a half bridge converter that uses a switch to supply the lamp drive power;

a lamp unit that uses the lamp drive power to emit light;

a reference voltage generator that uses a dimming capacitor to prevent abrupt changes in a reference voltage;

a feedback circuit that generates a feedback voltage based on a current flowing in the lamp unit and compares the feedback voltage to the reference voltage;

an oscillator that generates an oscillating signal based on a voltage output by the feedback circuit; and a half bridge converter driver that receives the oscillating signal from the oscillator and supplies a current that changes direction to the half bridge converter.

20. The lamp system of claim 19, wherein the reference voltage generator comprises:

a comparison voltage generator having a soft start current source and a soft start capacitor coupled to the soft start current source;

a first amplifier having a first current amplifier, wherein the first current amplifier has first and second non-inverting input terminals and a first inverting input terminal and wherein one of the first and second non-inverting input terminals is coupled to the soft start capacitor and the other one of the first and second non-inverting input terminals is coupled to a first amplifier reference voltage;

a first current source having a first current mirror, first and second resistors and a first transistor, wherein a first output terminal of the first current mirror is coupled to a collector terminal of the first transistor and a second output terminal of the first current mirror is coupled to the second resistor and wherein a base terminal of the first transistor is coupled to an output terminal of the first current amplifier and the first resistor is coupled between a ground potential and the inverting input terminal of the first current amplifier;

a capacitor charger that compares a voltage across the soft start capacitor to a first comparison reference voltage and charges a dimming capacitor based on the comparison;

a second amplifier having a second current amplifier, wherein the second current amplifier has third and fourth non-inverting input terminals and a second inverting input terminal and wherein one of the third and fourth non-inverting input terminals is coupled to a dimming voltage and the other one of the third and fourth non-inverting input terminals is coupled to a second amplifier reference voltage and wherein an output terminal of the second current amplifier is coupled to the dimming capacitor and the second current amplifier selects the smaller of the dimming voltage and the second amplifier reference voltage to control a charging characteristic of the dimming capacitor;

a second current source that supplies a current proportional to the voltage selected by the second current amplifier and the charging characteristic of the dimming capacitor; and an ON/OFF controller that controls the operation of a lamp system based on a comparison of the dimming voltage to a second comparison reference voltage.

* * * * *